United States Patent Office 3,079,400
Patented Feb. 26, 1963

3,079,400
THIAZOCINE COMPOUNDS
Harry L. Yale, New Brunswick, Francis A. Sowinski, Edison, and Edward J. Pribyl, Metuchen, N.J., assignors to Olin Mathieson Chemical Corporation, New York, N.Y., a corporation of Virginia
No Drawing. Filed Feb. 20, 1961, Ser. No. 90,237
14 Claims. (Cl. 260—327)

This invention relates to thiazocine compounds. More particularly, the invention relates to basically substituted thiazocines, their acid addition salts, processes for the preparation thereof and new intermediates useful in such processes.

The basically substituted thiazocines may be represented by the formula

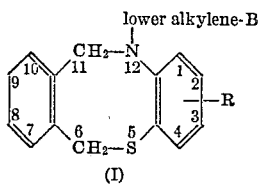

(I)

In the above formula and in those which follow, the various terms and symbols refer to the same substituent groups.

The lower alkylene groups in the formula are straight or branched chain aliphatic hydrocarbon groups such as methylene, ethylene, propylene, isopropylene, butylene, dimethylethylene and the like. The symbol R represents hydrogen, any of the four halogens, preferably chlorine or bromine, trihalomethyl groups such as trifluoromethyl, straight and branched chain lower alkoxy groups such as methoxy, ethoxy, propoxy, isopropoxy, butoxy and the like, trihalomethoxy, such as trifluoromethoxy, trihalomethylmercapto, such as trifluoromethylmercapto, and lower alkyl groups such as methyl, ethyl, propyl, isopropyl, butyl, isobutyl, t-butyl, amyl and the like.

The symbol B represents a basic, saturated, nitrogen-containing radical of less than 12 carbon atoms. The nitrogen may bear only hydrogen atoms, as in an amino group, or the nitrogen may contain two groups to form, for example, a dialkylamino substituent, such as dimethylamino, diethylamino, a di(hydroxyalkyl)amino substituent, such as di(hydroxyethyl)amino or the like. In addition, the nitrogen atom may form a saturated, 5- or 6-membered N-heterocyclic radical of less than 12 carbon atoms in which case B represents, for example, piperidyl [i.e. piperidino, 2-piperidyl, 3-piperidyl and 4-piperidyl]; (lower alkyl)piperidyl [e.g. 2-, 3-, or 4-(lower alkyl)piperidyl or 2-, 3-, or 4-(N-lower alkyl)piperidyl]; di(lower alkyl)piperidyl [e.g. 2,4- 2,5-, or 3,5-di(lower alkyl)piperidyl or 2-, 3-, or 4-(N-lower alkyl)-2, 3, or 4-(lower alkyl)piperidyl]; (lower alkoxy)piperidyl; pyrrolidyl; (lower alkyl)pyrrolidyl; di(lower alkyl)pyrrolidyl; (lower alkoxy)pyrrolidyl); morpholinyl [i.e. morpholinyl [i.e. morpholino 2-morpholinyl and 3-morpholinyl]; (lower alkyl)morpholinyl; di(lower alkyl)-morpholinyl; (lower alkoxy)morpholinyl; thiamorpholinyl; (lower alkyl)thiamorpholinyl; di(lower alkyl)thiamorpholinyl; (lower alkoxy)thiamorpholinyl; piperazinyl; (lower alkyl)piperazinyl [e.g. $N^4$-methylpiperazinyl]; di(lower alkyl piperazinyl; (lower alkoxy)piperazinyl; (hydroxy-lower alkyl)piperazinyl [e.g. $N^4$-(2-hydroxyethyl)piperazinyl]; (lower alkanoyloxyalkyl)piperazinyl [e.g. $N^4$-(2-acetoxyethyl)piperazinyl]; (hydroxy-lower alkoxy-lower alkyl)piperazinyl [e.g. $N^4$ - (2-hydroxyethoxyethyl)piperazinyl]; and (carbo-lower alkoxy) piperazinyl [e.g. $N^4$-(2-carbomethoxy-, carboethoxy-, or carbopropoxy)piperazinyl].

The particular preferred compounds are those wherein R represents chloro, trifluoromethyl, t-butyl, methoxy or trifluoromethylmercapto, and B represents dimethylamino, diethylamino or hydroxyethylpiperazinyl.

The compounds of Formula I may be produced by reacting a 11,12-dihydro-6H-dibenzo[b,f][1,4]thiazocine of the formula

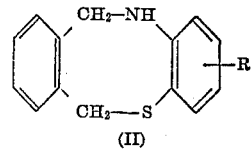

(II)

with a haloacyl halide, preferably wherein the halogens are chlorine, e.g. α-chloracetyl chloride, β-chloropropionyl chloride, β-chloro-α-methylpropionyl chloride, chlorobutyryl chloride or the like. This reaction, in which the haloacyl halide is preferably utilized in excess, produces an intermediate of the formula

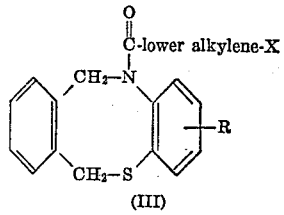

(III)

X in the above formula represents a halogen atom.

Reduction of the compound of Formula III with a metal hydride such as lithium aluminum hydride in an organic solvent produces a compound of the formula

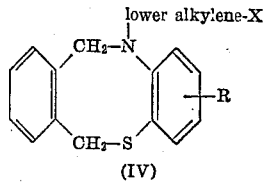

(IV)

The compound of Formula IV will then react with an amine (including a heterocyclic), preferably used in excess and in a non-aqueous organic solvent such as toluene, to produce the product of Formula I.

Alternatively, the compound of Formula III may first be condensed with the amine and then the resulting condensation product of the formula

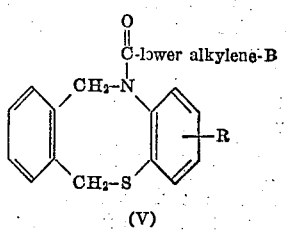

(V)

reduced with a metal hydride in the same manner described previously.

Alternatively, a 11,12 - dihydro-6H-dibenzo[b,f][1,4]-thiazocine of the Formula II may be reacted with a dialkylaminoalkyl halide, e.g. dimethylaminopropyl chloride, diethylaminoethyl chloride or 3-(4-methylpiperazinyl)propyl chloride in the presence of an alkaline condensing agent, e.g. sodium hydride, to give a compound of the Formula I.

As a further alternative, a 11,12-dihydro-6H-dibenzo[b,f][1,4]thiazocine of the Formula II may be reacted with an Ω-haloalkylenehalide, e.g. trimethylene chlorobromide, tetramethylene chlorobromide or hexamethylene chlorobromide in the presence of an alkaline condensing agent, e.g. sodium hydride, to give a 12-(Ω-haloalkylene)-

11,12 dihydro-6H-dibenzo[b,f][1,4]thiazocine; this intermediate is then reacted with a nitrogen-containing radical of less than 12 carbon atoms as defined above to give a compound of Formula I.

The 11,12-dihydro-6H-dibenzo[b,f][1,4]thiazocines of Formula II which are the starting materials are produced by reacting an α,α′-dihalo-o-xylene with an appropriately ar-substituted o-aminobenzenethiol in a solvent-like acetic acid or N,N-dimethylformamide at elevated temperatures.

The compounds of Formula I form acid addition salts by reaction with an equimolar proportion or excess of an inorganic or organic acid. Such salts include hydrohalides such as hydrochloride, hydrobromide, hydroiodide and the like, other mineral acid salts such as phosphate, sulfate, nitrate, etc., organic acid salts, such as oxalate, tartrate, malate, citrate, camphorsulfonate, benzenesulfonate, toluenesulfonate, salicylate, benzoate, ascorbate, mandelate, and the like.

The compounds of this invention are useful as ataractic agents, antihistaminics or antispasmodics. They may be administered orally or parenterally by incorporating the base or a pharmaceutically acceptable acid addition salt thereof in a suitable carrier to form tablets, capsules, elixirs, injectables and the like according to conventional practice. Precursor compounds are useful as intermediates for such products.

The following examples are illustrative of the invention. All temperatures are expressed in degrees centigrade.

EXAMPLE 1

*12 - (3 - dimethylaminopropyl) - 11,12-dihydro-6H-dibenzo[b,f][1,4]-thiazocine 11,12 - dihydro - 6H - dibenzo [b,f][1,4]thiazocine.*—To a stirred solution of 57.5 g. of α,α′-dibromo-o-xylene in 175 ml. of dimethylformamide are added 26.5 g. of o-aminobenzenethiol in 100 ml. of glacial acetic acid. The mixture is heated at 85–90° for three hours, cooled, the crystalline 11,12-dihydro-6H-dibenzo[b,f][1,4]thiazocine, hydrobromide filtered and stirred into 100 ml. of 20% aqueous sodium hydroxide and 250 ml. of ether. The ether solution is separated and concentrated to give 18.0 g. of 11,12-dihydro-6H-dibenzo[b,f][1,4]thiazocine, M.P. 104–106°.

*12 - (β - chloropropionyl)-11,12 - dihydro - 6H-dibenzo [b,f][1,4]thiazocine.*—A mixture of 5.5 g. of 11,12-dihydro-6H-dibenzo[b,f][1,4]thiazocine, 6.4 g. of β-chloropropionyl chloride and 100 ml. of dry toluene is refluxed for two hours and concentrated to dryness. The residual solid is recrystallized from Skellysolve E to give 7 g. of product, M.P. 157–159°.

*12 - (3 - chloropropyl)-11,12-dihydro-6H-dibenzo[b,f] [1,4]thiazocine.*—To a stirred suspension of 0.58 g. of powdered lithium aluminum hydride in 50 ml. of anhydrous ether is added during 0.5 hour a solution of 3.2 g. of 12 - (β-chloropropionyl)-11,12-dihydro-6H-dibenzo [b,f][1,4]thiazocine in 200 ml. of anhydrous ether. The reaction mixture is refluxed and stirred for one hour, cooled, and treated first with 2.5 ml. of water and then with 2.5 ml. of 10% sodium hydroxide solution. The solution is filtered, the filtrate is dried, and concentrated to give a viscous residual oil. The oil is dissolved in ether and the solution treated with hydrogen chloride to precipitate the hydrochloride. Decomposition of the hydrochloride with aqueous potassium carbonate solution gives 3.1 g. of 12-(3-chloropropyl)-11,12-dihydro-6H-dibenzo[b,f][1,4]thioazocine.

*12 - (3 - dimethylaminopropyl) - 11,12-dihydro-6H-dibenzo[b,f][1,4]thiazocine.*—A mixture of 3.1 g. of the chloropropyl compound obtained above, 30 ml. of toluene and 6 g. of anhydrous dimethylamine is heated in a bomb tube at 98° for 24 hours, filtered, and the filtrate concentrated to dryness. The residual oil is dissolved in ether, the ether solution is extracted with 5% hydrochloric acid, the acid extract made alkaline, and the base taken up in ether. Concentration of the ether extract gives 1.8 g. of 12 - (3 - dimethylaminopropyl) 11,12-dihydro - 6H-dibenzo [b,f][1,4]thiazocine as colorless viscous oil.

*12 - (3 - dimethylaminopropyl) - 11,12-dihydro-6H-dibenzo[b,f][1,4]-thiazocine oxalate.*—To a cooled solution of 1.8 g. of the above base in 100 ml. of anhydrous ether is added 0.54 g. of oxalic acid in 25 ml. of isopropyl ether. The salt separates and is recrystallized from absolute ethanol to give 1.1 g. of product, M.P. 171–172°.

*Alternate Methods.*—(A) 12-(3-dimethylaminopropyl)-11,12-dihydro-6H-dibenzo[b,f][1,4]thiazocine is also produced by the following reactions:

7.0 g. of 12-(β-chloropropionyl)-11,12-dihydro-6H-dibenzo[b,f][1,4]thiazocine, 100 ml. of dry toluene and 5 ml. of dimethylamine are heated for 24 hours at 93° (bomb tube). The cooled tube is opened, the dimethylamine hydrochloride is filtered off and the filtrate is concentrated to dryness in vacuo. The residual solid, 12-(3-dimethylaminopropionyl) - 11,12 - dihydro-6H-dibenzo[b,f][1,4]thiazocine, is crystallized from Skellysolve E (petroleum hydrocarbons), M.P. 134–136°. 1.0 g. of 12-(3 - dimethylaminopropionyl)-11,12-dihydro-6H-dibenzo[b,f][1,4]thiazocine is dissolved in 25 ml. of dry ether and the solution is cooled and treated with one equivalent of hydrogen chloride in ether. The hydrochloride separates as a white crystalline solid.

7.6 g. of the above base are suspended in 200 ml. of anhydrous ether, the suspension is added gradually to a suspension of 1.75 g. (0.056 mole) of lithium aluminum hydride in 100 ml. of anhydrous ether and the reduction is carried out as described above, to give 12-(3-dimethylaminopropyl) - 11 - 12-dihydro-6H-dibenzo[b,f][1,4]thiazocine.

(B) A mixture of 6.0 g. of 11,12-dihydro-6H-dibenzo[b,f][1,4]thiazocine, 1.4 g. of a 50% dispersion of sodium hydride in mineral oil and 200 ml. of dry xylene is stirred at 95° for two hours, 4.6 g. of 3-dimethylaminopropyl chloride in 50 ml. of dry xylene are added and the heating continued for six hours. The reaction mixture is worked up to give 3.3 g. of 12-(3-dimethylaminopropyl)-11,12-dihydro-6H-dibenzo[b,f][1,4]thiazocine, B.P. 153–155° (0.1 mm.).

(C) A mixture of 157.5 g. of trimethylenechlorobromide, 179.3 g. of 11,12-dihydro-6H-dibenzo[b,f][1,4]-thiazocine, 43.2 g. of a 50% dispersion of sodium hydride in mineral oil and 2,500 ml. of dry xylene is heated at 95–100° for eight hours, filtered while hot, and the filtrate concentrated to dryness in vacuo. The residual oil is dissolved in 750 ml. of boiling petroleum ether, the solution cooled, and the unreacted 11,12-dihydro-6H-dibenzo[b,f][1,4]thiazocine which crystallizes, is filtered off. The petroleum ether filtrate is concentrated by distillation in vacuo to give 168 g. of 12-(3-chloropropyl)-11,12-dihydro-6H-dibenzo[b,f][1,4]thiazocine as a viscous oil.

The above oil, 3.04 g., 0.9 g. of anhydrous dimethylamine and 25 ml. of dry toluene are heated for three hours at 95° and the reaction mixture worked up to give 2.9 g. of 12-(3-dimethylaminopropyl)-11,12-dihydro-6H-dibenzo[b,f][1,4]thiazocine.

EXAMPLE 2

*12-(2-Dimethylaminoethyl)-11,12-Dihydro-6H-Dibenzo[b,f][1,4]Thiazocine*

By substituting 5.0 g. of 2-dimethylaminoethyl chloride for the 3-dimethylaminopropyl chloride of Example 1, part (B), there is obtained 3.1 g. of 12-(2-dimethylaminoethyl)-11,12-dihydro-6H-dibenzo[b,f][1,4]thiazocine.

EXAMPLE 3

*12-(3-Aminopropyl)-11,12-Dihydro-6H-Dibenzo[b,f] [1,4]Thiazocine*

3.04 g. of the product from Example 1, part (C), 35 ml. of toluene and 5.0 ml. of liquid ammonia are heated in a sealed tube at 80° for 24 hours. The cooled tube is opened, the contents are filtered, and the filtrate concentrated to dryness to give 12-(3-aminopropyl)-11,12-dihydro-6H-dibenzo[b,f][1,4]thiazocine.

EXAMPLE 4

*12 - (3 - Dimethylaminopropyl) - 2 - (Trifluoromethyl)-11,12-Dihydro-6H-Dibenzo[b,f][1,4]Thiazocine Hydrobromide*

By substituting 38.6 g. of 4-(trifluoromethyl)-o-aminobenzenethiol for the o-aminobenzenethiol in Example 1, there are obtained 23.5 g. of 2-(trifluoromethyl)-11,12-dihydro - 6H-dibenzo[b,f][1,4]thiazocine. By substituting 7.5 g. of this compound for the 6.0 g. of 11,12-dihydro-6H-dibenzo[b,f][1,4]thiazocine in Example 1, part (B), there are obtained 3.7 g. of 12-(3-dimethylaminopropyl)-2-(trifluoromethyl) - 11,12-dihydro-6H-dibenzo[b,f][1,4]-thiazocine. This base, dissolved in dry ether and treated with one equivalent of hydrogen bromide in ether gives the crystalline 12 - (3 - dimethylaminopropyl)-2-(trifluoromethyl) - 11,12-dihydro-6H-dibenzo[b,f][1,4]thiazocine hydrobromide.

EXAMPLE 5

*12-[3-(1-Methylpiperidyl)Methyl]-2-Methyl-11,12-Dihydro-6H-Dibenzo[b,f][1,4]Thiazocine*

(A) *3-amino-p-toluenesulfonyl chloride.*—To 209.2 g. of 3-amino-p-toluenesulfonic acid, sodium salt, and 10 ml. of dimethylformamide are added 250 ml. of thionyl chloride. The mixture is heated at 90° for 0.5 hour and concentrated in vacuo. To the residue are added 100 ml. of dry benzene and the mixture is again concentrated in vacuo. The product is purified by dissolving the residue in 100 ml. of ether and washing the ether solution with a saturated solution of sodium bicarbonate solution. After drying and removal of the ether there are obtained 167 g. of 3-amino-p-toluenesulfonyl chloride.

(B) *2-amino-p-toluenethiol.*—To 305 ml. of concentrated sulfuric acid and 2 ml. of finely cracked ice kept at −5° to 0° are added 167 g. of the 3-amino-p-toluenesulfonyl chloride followed by 280 g. of zinc dust, added in small portions. The reaction mixture is stirred for one hour and heated under reflux for eight hours. After cooling, the mixture is neutralized and steam distilled. The distillate is extracted with ether, the extract dried, concentrated and distilled to give 89 g. of 2-amino-p-toluenethiol. (C) By substituting 28.0 g. of 2-amino-p-toluenethiol for the o-aminobenzenethiol in Example 1, there is obtained 2 - methyl-11-12-dihydro-6H-dibenzo[b,f][1,4]-thiazocine. (D) By substituting 6.35 g. of the 2-methyl-11,12-dihydro-6H-dibenzo[b,f][1,4]thiazocine for the 6.0 g. of 11,12-dihydro-6H-dibenzo[b,f][1,4]thiazocine and 3.5 g. of 3-(1-methyl)-piperidylmethyl chloride for the 3-dimethylaminopropyl chloride in Example 1, part (B), there is obtained 12-[3-(1-methylpiperidyl)methyl]-2-methyl-11,12-dihydro-6H-dibenzo[b,f][1,4]thiazocine.

EXAMPLE 6

*12-[2-Pyrrolidinylethyl]-2-Methoxy-11,12-Dihydro-6H-Dibenzo[b,f][1,4]Thiazocine*

(A) *2-amino-p-anisylsulfonic acid, sodium salt.*—To a solution of 123.2 g. of m-anisidine in one l. of tetrachloroethane are added 128 g. of chlorosulfonic acid and the mixture stirred at 150° for one hour. The reaction mixture is cooled, the solid filtered, air dried and dissolved in one l. of hot N sodium hydroxide. The hot solution is filtered and cooled to give 180 g. of the sodium salt.

(B) *2-amino-p-anisylsulfonic chloride.*—Using in place of 3-amino-p-toluenesulfonic acid in Example 5, (A), 225.2 g. of 2-amino-p-anisylsulfonic acid, sodium salt there are obtained 177 g. of 2-amino-p-anisylsulfonyl chloride.

(C) *2-amino-p-anisylthiol.*—By the substitution of the 167 g. of 3-amino-p-toluenesulfonyl chloride in Example 5, part (B), by 180 g. of 2-amino-p-anisylsulfonyl chloride, there are obtained 95 g. of 2-amino-p-anisylthiol.

(D) By substituting 31 g. of 2-amino-p-anisylthiol for the o-aminobenzenethiol in Example 1, there is obtained 2 - methoxy - 11,12 - dihydro-6H-dibenzo[b,f][1,4]thiazocine.

(E) By substituting 6.7 g. of the product from step (D) above for the 6.0 g. of 11,12-dihydro-6H-dibenzo[b,f][1,4]thiazocine and 2.72 g. of 2-pyrrolidinylethyl chloride for the 3-dimethyl-aminopropyl chloride in Example 1, part (B), there is obtained 12-[2-pyrrolidinylethyl]-2-methoxy-11,12-dihydro-6H-dibenzo[b,f][1,4]thiazocine.

EXAMPLE 7

*2-Chloro-12-{3-[4-(Methylpiperazino)Propyl]}-11,12-Dihydro-6H-Dibenzo[b,f][1,4]Thiazocine*

(A) By substituting 32.0 g. of 4-chloro-o-aminobenzenethiol for the 26.5 g. of o-aminobenzenethiol in Example 1, there is obtained 2-chloro-11,12-dihydro-6H-dibenzo[b,f][1,4]thiazocine.

(B) By substituting 4.4 g. of 3-(4-methylpiperazino) propyl chloride (prepared from N-methylpiperazine and trimethylene chlorobromide) for the 4.6 g. of 3-dimethylaminopropyl chloride in Example 1, part (C), there is obtained 2-chloro-12-{3-[4-(methylpiperazino)propyl]}-11,12-dihydro-6H-dibenzo[b,f][1,4]-thiazocine.

EXAMPLE 8

*2-{3 - [4 - (Hydroxyethylpiperazino)Propyl]} - 2 - (Trifluoromethylmercapto) - 11,12 - Dihydro-6H-Dibenzo[b,f][1,4]Thiazocine Hydrobromide*

(A) By substituting 139.2 g. of m-nitrothoanisole for the m-anisidine in Example 6, (A), there are obtained 135 g. of 2-nitro-p-thioanisylsulfonic acid, sodium salt.

(B) By substituting 241.2 g. of 2-nitro-p-thioanisylsulfonic acid, sodium salt for the 2-p-anisylsulfonic acid, sodium salt, of Example 6, (B), there are obtained 183 g. of 2-nitro-p-thioanisylsulfonyl chloride.

(C) To 16.0 g. of the product from (B) above in 100 ml. of purified carbon tetrachloride, while illuminated with a Hanovia ultraviolet lamp, is introduced a slow stream of gaseous chlorine. An exothermic reaction occurs and hydrogen chloride is evolved. When the evolution of hydrogen chloride ceases, the reaction mixture is concentrated to give 2-nitro-p-(trichloromethylmercapto) benzenesulfonyl chloride as a residual oil.

(D) The 2-nitro - p - (trichloromethylmercapto)benzenesulfonyl chloride from step (C) above is dissolved in dry benzene, 24.0 g. of antimony trifluoride is added and the mixture is refluxed for six hours to give 2-nitro-p-(trifluoromethylmercapto)-benzenesulfonyl fluoride.

(E) The product from (D) above by the procedure of Example 5, part (B) gives 14.3 g. of 2-amino-p-(trifluoromethylmercapto)-benzenethiol.

(F) By substituting 45.0 g. of 2-amino-p-(trifluoromethylmercapto)-benzenethiol for the o-aminobenzenethiol in Example I there is obtained 2(trifluoromethylmercapto) - 11,12 - dihydro - 6H - dibenzo - [b,f][1,4] thiazocine.

(G) By employing 11.6 g. of the product from (F) above, 0.88 g. of a 50% dispersion of sodium hydride in mineral oil, 10.8 g. of trimethylene chlorobromide and 100 ml. of dry xylene, as in Example 1, part (C), there is obtained 12 - (3-chloropropyl)-2-(trifluoromethylmercapto)-11,12-dihydro-6H-dibenzo[b,f][1,4]thiazocine, as an oil.

(H) The product from (G) above, 4.05 g., 100 ml. of methyl ethyl ketone, 1.5 g. of sodium iodide, and 2.52 g. of 2-hydroxyethylpiperazine are stirred and refluxed for 18 hours, and the reaction mixture is concentrated to dryness. The residual semi-solid mass is dissolved in water and extracted with ether. The ether extracts are extracted wtih three 100 ml. portions of 5% hydrochloric acid. These extracts are concentrated to dryness in vacuo. The crystalline residue consists of 12-{3-[4-(hydroxyethylpiperazino)]propyl}-2-(trifluoromethylmercapto) - 11,12-dihydro-6H-dibenzo[b,f][1,4]thiazocine hydrochloride.

EXAMPLE 9

*2-(Trifluoromethoxy)-11,12-Dihydro-6H-Dibenzo[b,f] [1,4]Thiazocine*

(A) By substituting 16.7 g. of 2-nitro-p-anisylsulfonyl chloride for the 2-nitro-p-thioanisylsulfonyl chloride in Example 8, part (C), there is obtained 2-nitro-p-(trichloromethoxy)benzenesulfonyl chloride.

(B) By substituting the product from (A) above for the 2 - nitro-p-(trichloromethylmercapto)benzenesulfonyl chloride in Example 8, part (D), there is obtained 2-nitro-p-(trifluoromethoxy)benzenesulfonyl fluoride.

(C) The product from (B) above, by the procedure of Example 5, part (B), gives 11.2 g. of 2-amino-p-(trifluoromethoxy)benzenethiol.

(D) By the procedure of Example 1, 11.2 g. of the 2-amino-p-(trifluoromethoxy)benzenethiol, 8.8 g. of α,α'-dibromo-o-xylene, 30 ml. of dimethylformamide and 20 ml. of glacial acetic acid give 4.6 g. of 2-(trifluoromethoxy)-11,12-dihydro-6H-dibenzo[b,f][1,4]thiazocine.

EXAMPLE 10

*12-Aminoacetyl-11,12-Dihydro-6H-Dibenzo[b,f][1,4]-Thiazocine*

By substituting 5.7 g. of chloroacetyl chloride for the 6.4 g. of β-chloropropionyl chloride of Example 1, there is obtained 12-(chloroacetyl)-11,12-dihydro-6H-dibenzo[b,f][1,4]thiazocine. The chloroacetyl derivative, 6.9 g., and 10 ml. of liquid ammonia are sealed into a glass tube and agitated for two days. The tube is cooled, opened, the ammonia is allowed to evaporate and the residue washed with cold water to give 12-aminoacetyl-11,12-dihydro-6H-dibenzo[b,f][1,4]thiazocine.

EXAMPLE 11

*2-(Trifluoromethyl)-12-[β-(4-Methylpiperazine)Propionyl]-11,12-Dihydro-6H-Dibenzo[b,f][1,4]Thiazocine*

A mixture of 12.7 g. of β-chloropropionyl chloride, 29.5 g. of 2-(trifluoromethyl)-11,12-dihydro-6H-dibenzo-[b,f][1,4]thiazocine in 200 ml. of dry toluene are reacted as in Example 1, to obtain 2-(trifluoromethyl)-12-(β-chloropropionyl)-11,12-dihydro - 6H - dibenzo[b,f][1,4]-thiazocine. This latter derivative, 3.87 g., 3.0 g. of N-methylpiperazine and 25 ml. of toluene are heated under reflux for two hours, cooled and filtered. The filtrate is evaporated to dryness to give 4.3 g. of 2-(trifluoromethyl)-12[β-(4-methylpiperazino)propionyl] - 11,12 - dihydro-6H-dibenzo[b,f][1,4]thiazocine.

EXAMPLE 12

*2-Methoxy-12-(β-Diethylaminopropionyl)-11,12-Dihydro-6H-Dibenzo[b,f][1,4]Thiazocine*

A mixture of 12.7 g. of β-chloropropionyl chloride, 25.7 g. of a 2-methoxy-11,12-dihydro-6H-dibenzo[b,f]-[1,4]thiazocine are reacted as in Example 11 to give 30.2 g. of 2-methoxy-12-(β-chloropropionyl)-11,12-dihydro-6H-dibenzo[b,f][1,4]thiazocine. This product, 30.2 g. and 12.6 g. of diethylamine in 200 ml. of dry toluene are heated four hours in a sealed vessel to give 2-methoxy-12-(β-diethylaminopropionyl) - 11,12 - dihydro-6H-dibenzo[b,f][1,4]thiazocine.

EXAMPLE 13

*2-Chloro-12-(Dimethylaminopropionyl)-11,12-Dihydro-6H-Dibenzo[b,f][1,4]Thiazocine*

As in Example 11, 2.62 g. of 2-chloro-11,12-dihydro-6H-dibenzo[b,f][1,4]thiazocine and 1.3 g. of α-chloropropionyl chloride are reacted to give 3.25 g. of 2-chloro-12-(α-chloropropionyl) - 11,12 - dihydro - 6H - dibenzo-[b,f][1,4]thiazocine; the latter, with one g. anhydrous dimethylamine in 50 ml. of toluene, shaken for three days at room temperature, give 2-chloro-12-(α-dimethylaminopropionyl)-11,12-dihydro - 6H - dibenzo[b,f][1,4]thiazocine.

EXAMPLE 14

*2-Methyl-12-(α-Dimethylaminobutyryl)-11,12-Dihydro-6H-Dibenzo[b,f][1,4] Thiazocine*

2-methyl-11,12-dihydro - 6H - dibenzo[b,f][1,4]thiazocine, 2.41 g., 2.8 g. α-chlorobutyryl chloride and 50 ml. of toluene are reacted as in Example 1 to give 3.0 g. of 2-methyl-12-(α-chlorobutyryl) - 11,12 - dihydro-6H-dibenzo[b,f][1,4]thiazocine; and this derivative, 3.0 g. and 1.0 g. dimethyl amine in 25 ml. of toluene, shaken four days, gives 2-methyl-12(α-dimethylaminobutyryl)-11,12-dihydro-6H-dibenzo[b,f][1,4]thiazocine.

EXAMPLE 15

*2-(Trifluoromethylmercapto)-12-(β-Piperidinopropionyl)11,12-Dihydro-6H-Dibenzo[b,f][1,4]Thiazocine Hydrochloride*

The reaction between 3.27 g. of 2-(trifluoromethylmercapto)-11,12-dihydro - 6H - dibenzo[b,f][1,4]thiazocine and 2.54 g. of β-chloropropionyl chloride in 25 ml. toluene gives as a crystalline solid, 3.9 g. of 2-(trifluoromethylmercapto)-11,12-dihydro - 12 - (β-chloropropionyl) - 6H - dibenzo[b,f][1,4]thiazocine. This crystalline solid, 0.75 g. of piperidine and 25 ml. of toluene are heated for four hours at 50°, with agitation and cooled to give 2-(trifluoromethylmercapto) - 12 - (β-piperidinopropionyl)-11,12-dihydro - 6H - dibenzo[b,f][1,4]thiazocine hydrochloride as a white crystalline solid.

This invention may be variously otherwise embodied within the scope of the appended claims.

What is claimed is:

1. A compound selected from the group consisting of bases of the formula

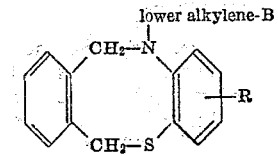

wherein R represents a member of the group consisting of hydrogen, halogen, trihalomethyl, lower alkoxy, trihalomethoxy, trihalomethylmercapto and lower alkyl, and B represents a member of the group consisting of amino, di-lower alkylamino, di(hydroxy-lower alkyl)amino, piperidyl, (lower alkyl)piperidyl, di(lower alkyl)piperidyl, (lower alkoxy)piperidyl, pyrrolidyl, (lower alkyl)pyrrolidyl, di(lower alkyl)pyrrolidyl, (lower alkoxy)pyrrolidyl, morpholinyl, (lower alkyl)morpholinyl, di(lower alkyl)morpholinyl, (lower alkoxy)morpholinyl, thiamorpholinyl, (lower alkyl)thiamorpholinyl, di(lower alkyl)-thiamorpholinyl, (lower alkoxy)thiamorpholinyl, piperazinyl, (lower alkyl)piperazinyl, di(lower alkyl)piperazinyl, (lower alkoxy)piperazinyl, (hydroxy-lower alkyl)-piperazinyl, (lower alkanoyloxy-lower alkyl)piperazinyl, (hydroxy-lower alkoxy-lower alkyl)piperazinyl and (carbo-lower alkoxy)piperazinyl, and pharmaceutically acceptable acid-addition salts thereof.

2. 12-[di(lower alkyl)amino-lower alkylene]-11,12-dihydro-6H-dibenzo[b,f][1,4]thiazocine.

3. 12-(2-dimethylaminopropyl) - 11,12 - dihydro-6H-dibenzo[b,f][1,4]thiazocine.

4. 2-trihalomethylmercapto-12-[di(lower alkyl)amino-lower alkylene] - 11,12 - dihydro-6H-dibenzo[b,f][1,4]-thiazocine.

5. 2-trihalomethyl - 12 - [di(lower alkyl)amino-lower alkylene] - 11,12 - dihydro-6H-dibenzo[b,f][1,4]thiazocine.

6. A compound selected from the group consisting of bases of the formula

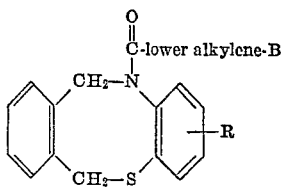

wherein R represents a member of the group consisting of hydrogen, halogen, trihalomethyl, lower alkoxy, trihalomethoxy, trihalomethylmercapto and lower alkyl, and B represents a member of the group consisting of amino, di-lower alkylamino, di(hydroxy-lower alkyl)amino, piperidyl, (lower alkyl)piperidyl, di(lower alkyl)piperidyl, (lower alkoxy)piperidyl, pyrrolidyl, (lower alkyl)pyrrolidyl, di(lower alkyl)pyrrolidyl, (lower alkoxy)pyrrolidyl, morpholinyl, (lower alkyl)morpholinyl, di(lower alkyl)morpholinyl, (lower alkoxy)morpholinyl, thiamorpholinyl, (lower alkyl)thiamorpholinyl, di(lower alkyl)thiamorpholinyl, (lower alkoxy)thiamorpholinyl, piperazinyl, (lower alkyl)piperazinyl, di(lower alkyl)piperazinyl, (lower alkoxy)piperazinyl, (hydroxy-lower alkyl)piperazinyl, (lower alkanoyloxy-lower alkyl)piperazinyl, (hydroxy-lower alkoxy-lower alkyl)piperazinyl and (carbo-lower alkoxy)piperazinyl, and acid addition salts thereof.

7. 12[di(lower alkyl)amino-lower alkanoyl-11,12-dihydro-6H-dibenzo[b,f][1,4]thiazocine.

8. 12-(3-dimethylaminopropionyl) - 11,12 - dihydro-6H-dibenzo[b,f][1,4]thiazocine.

9. 2-trihalomethyl - 12 - [di(lower alkyl)amino-lower alkanoyl]-11,12-dihydro-6H-dizenzo[b,f][1,4]thiazocine.

10. 2-lower alkyl-12-[di(lower alkyl)amino-lower alkanoyl]-11,12-dihydro - 6H - dibenzo[b,f][1,4]thiazocine.

11. 11,12-dihydro - 6H - dibenzo[b,f][1,4]thiazocine.

12. 2-trihalomethyl - 11,12 - dihydro-6H-dibenzo[b,f]-[1,4]thiazocine.

13. 2-trifluoromethyl - 11,12 - dihydro-6H-dibenzo[b,f][1,4]thiazocine.

14. 2-trihalomethylmercapto - 11,12 - dihydro-6H-dibenzo[b,f][1,4]thiazocine.

References Cited in the file of this patent
UNITED STATES PATENTS

| 2,852,510 | Hoffmann et al. | Sept. 16, 1958 |
| 2,852,528 | Hoffmann et al. | Sept. 16, 1958 |

FOREIGN PATENTS

| 834,281 | Great Britain | May 4, 1960 |